United States Patent [19]
Tsuyuguchi et al.

[11] Patent Number: 4,926,403
[45] Date of Patent: May 15, 1990

[54] MAGNETO-OPTIC RECORDING APPARATUS FOR RECORDING INFORMATION SELECTIVELY ON BOTH SIDES OF THE RECORDING MEDIUM

[75] Inventors: Hiroshi Tsuyuguchi; Kenji Shimozawa; Takashi Kamisaka, all of Tokyo, Japan

[73] Assignee: TEAC Corporation, Tokyo, Japan

[21] Appl. No.: 242,370

[22] Filed: Sep. 9, 1988

[30] Foreign Application Priority Data

Sep. 10, 1987 [JP] Japan .............................. 62-138562[U]
Sep. 24, 1987 [JP] Japan .................................. 62-239701

[51] Int. Cl.⁵ ...................... G11B 7/00; G11B 11/00; G11B 11/14
[52] U.S. Cl. .................................... 369/13; 360/114; 369/199
[58] Field of Search ...................... 369/13, 195, 199; 360/114; 365/122

[56] References Cited

U.S. PATENT DOCUMENTS

| 3,774,172 | 11/1973 | Silverman | 369/34 X |
| 3,905,040 | 9/1975 | Otala | 369/13 X |
| 4,416,003 | 11/1983 | Suzuki | 369/75.2 |
| 4,566,087 | 1/1986 | Kraft | 369/34 |

*Primary Examiner*—Robert L. Richardson
*Attorney, Agent, or Firm*—Michael N. Meller

[57] ABSTRACT

A magneto-optical recording system comprises a first optical system carried by a first focusing actuator disposed at a first side of a magneto-optical recording medium and second optical system carried by a second focusing actuator disposed at a second side of the magneto-optical recording medium. When recording an information signal on the first side of the magneto-optical recording medium by means of an optical beam focused by the first optical system, the second focusing actuator is supplied with a biasing current and produces a magnetic field for recording. When recording an information signal on the second side of the magneto-optical recording medium, the first focusing actuator is supplied with a biasing current and produces a second magnetic field for recording.

6 Claims, 2 Drawing Sheets

MAGNETO-OPTIC RECORDING APPARATUS FOR RECORDING INFORMATION SELECTIVELY ON BOTH SIDES OF THE RECORDING MEDIUM

BACKGROUND OF THE INVENTION

The present invention generally relates to recording of information signals on magneto-optical recording media, and in particular to an optical recording system for recording an information signal selectively on both sides of a disk-shaped magneto-optical recording medium.

In magneto-optical recording of an information signal, the information signal is recorded on an magneto-optical disk which is a recording disk deposited with a magnetic material by means of an optical beam. The optical beam heats the magnetic material under an external magnetic field and the magnetic material is magnetized in the direction of the magnetic field upon cooling. The reading of the recorded information is made by irradiating the optical beam on the surface of the disk. Upon reflection, the plane of polarization of the optical beam is rotated in a first direction or second direction responsive to the direction of magnetization of the magnetic material as a result of the electrooptic Kerr effect, and the recorded information is reproduced by detecting the change in the plane of polarization of the reflected optical beam.

Generally, conventional magneto-optical disk recording/reproducing apparatus records and reproduces an information signal on one side of a disk-shaped magneto-optical recording medium (referred to hereinafter as a disk) by means of an optical recording/reproducing system. Such an optical recording/reproducing system comprises a light source, an optical system including lenses and mirrors, focusing and tracking mechanisms, and light detection elements. The optical recording/reproducing system is sometimes referred to as an optical head and focuses an optical beam on the disk and receives the optical beam reflected back from the disk. In such a disk, it is naturally desirable that the both sides of the disk can be used for storage of the information signal so that the recording capacity per one disk is increased. However, because of the expensive optical elements used in the optical recording/reproducing system, the prior art magneto-optical recording and reproducing system generally use one such optical recording/reproducing system and the recording is made only on one side of the disk.

In order to enable the recording and reproducing of the information signal on and from the both sides of the disk, one may use a well known automatic turn-over mechanism which turns the disk upside down while using a single optical head for focusing the optical beam on the lower side of the disk, for example. However, such automatic turn-over mechanism is complex and occupies a large space not only with respect to mechanism itself but also due to the movement of the disk at the time of turn-over. Therefore, the magneto-optical disk recording and reproducing apparatus using such automatic turn-over mechanism inevitably becomes bulky and complex.

Also, there is a known construction for an optical disk recording apparatus as proposed in the Laid-open Japanese patent application No. 54-35707, in which a pair of optical systems are provided on both sides of a disk for recording the information signal on the both sides of the disk. In applying the construction of this known optical disk recording apparatus to the recording and reproducing of the information signal on the both sides of a magneto-optical disk, two expensive as well as bulky and heavy optical recording/reproducing systems have to be used. Therefore, the apparatus inevitably becomes expensive, large and heavy. Further, such an apparatus has a problem of a large access time which is a time required for the optical recording/reproducing system to move to a desired track position, as a result of the relatively large inertia of the optical recording/reproducing system. Furthermore, the magneto-optical recording and reproducing apparatus requires a permanent magnet or solenoid on the opposite side of the disk for producing the magnetic field which is used for magnetization of the magnetic material at the time of recording. Thus, the construction as proposed in the Laid-open Japanese patent application can not be used for a recording/reproducing apparatus for recording and/or reproducing the information signal on both sides of the disk as the other side of the disk is occupied by the optical recording/reproducing system and no space is available for such a magnet or solenoid.

SUMMARY OF THE INVENTION

Accordingly, it is an object of the present invention to provide a magneto-optical recording system in which the aforementioned problems are eliminated.

Another and more specific object of the present invention is to provide a magneto-optical recording system in which an information signal is recorded on both sides of a disk-shaped magneto-optical recording medium without turning over the disk.

Another object of the present invention is to provide a magneto-optical recording system for recording an information signal on both sides of a magneto-optical information recording medium (disk) comprising a first optical system including a first objective lens and a first electromagnetic actuator carrying the first optical system at a first side of the disk for focusing a first optical beam on a first recording surface at the first side of the disk, and a second optical system including a second objective lens and a second electromagnetic actuator carrying the second optical system at the second side of the disk for focusing a second optical beam on a second recording surface at the second side of the disk, in which the solenoid of the second electromagnetic focusing actuator is used for producing a first magnetic flux which passes through the disk in a first direction by energizing the solenoid by a biasing current when the first recording surface of the disk is irradiated by the first optical beam for recording, and the solenoid of the first electromagnetic focusing actuator is used for producing a second magnetic flux which passes through the disk in a second direction which may be opposite to the direction of the first magnetic flux by energizing the solenoid by the biasing current when the second recording surface of the disk is irradiated by the second optical beam.

According to the present invention, the information signal can be recorded on and reproduced from the both sides of the magneto-optical disk with an optical recording/reproducing system having a compact arrangement. More specifically, the optical recording/reproducing system of the present invention eliminates the use of the bulky and complex automatic turn-over mechanism for the recording and reproduction of the information signal on the both sides of the disk. Further, the obstructing permanent magnet or electromagnetic solenoid used in the prior art magneto-optical recording and reproducing apparatus which prevented provision of the second optical system at the other side of the disk is replaced by the electromagnetic solenoid of the electromagnetic focusing actuator of the second optical system disposed on the other side of the disk. Thus, the magneto-optical recording of the information signal on the both sides of the disk can be achieved simply by selectively using the first and second optical systems together with the selective energization of the solenoid of the optical system at the other side of the disk. Further, the number of bulky and heavy optical beam transmission and reception means can be reduced and the size of the apparatus can be significantly reduced. Further, the access time is reduced as a result of the use of the first and second optical systems which are relatively light weighted. Thus, the efficiency in the operation of the apparatus is improved. Furthermore, the cost of the optical disk recording and reproducing apparatus is reduced, as a number of expensive optical elements used in the optical beam transmission and reception means are saved.

Still other objects and further features of the present invention will become apparent from the following detailed description on the preferred embodiments when read in conjunction with the attached drawings.

DETAILED DESCRIPTION

Figure 1:
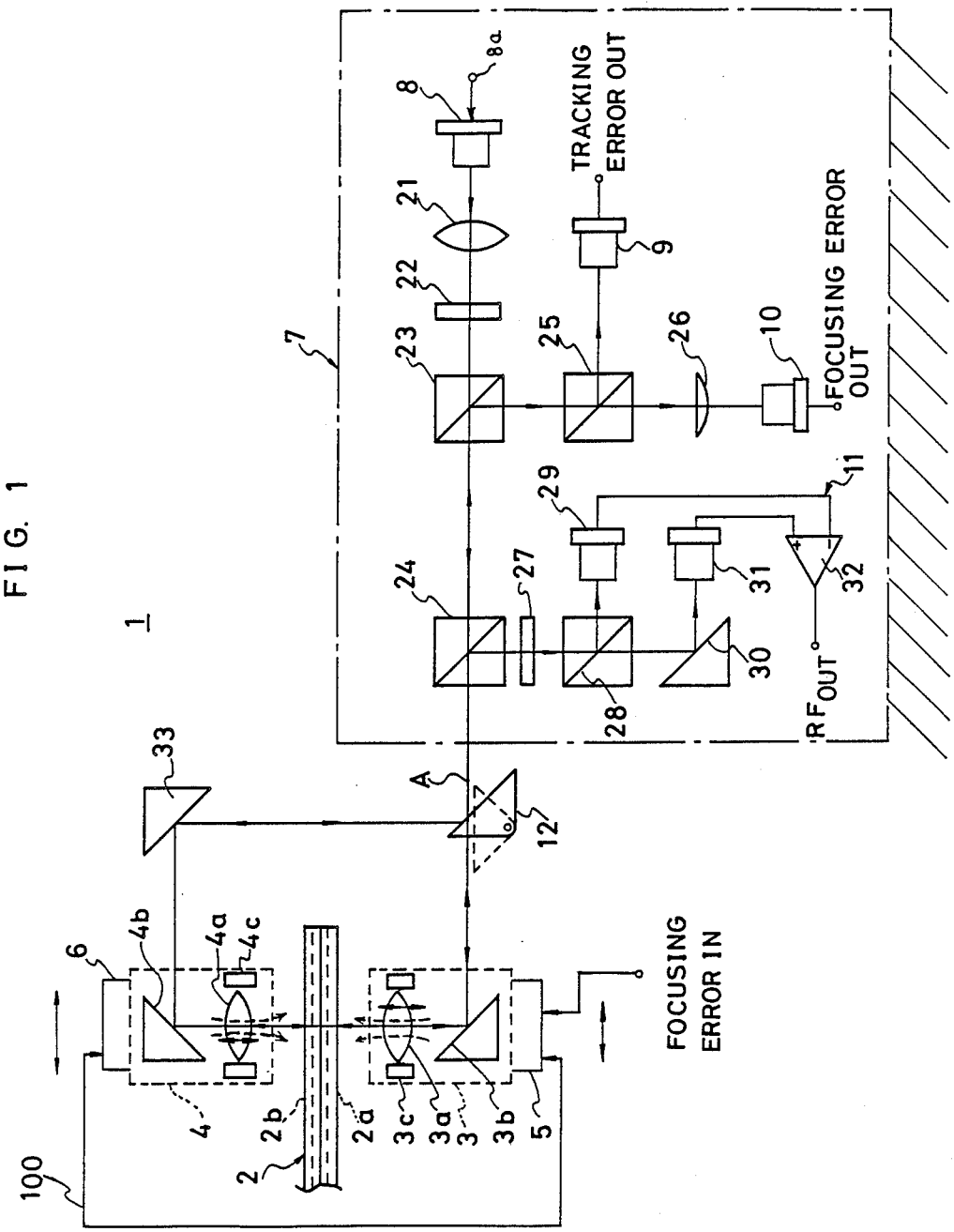
FIG.1 is a schematic view showing an embodiment of the optical recording/reproducing system of the present invention as applied to a magneto-optical disk recording and reproducing apparatus.

FIG.1 shows an embodiment of the optical recording/reproducing system of the present invention as applied to a magneto-optical disk recording and reproducing apparatus. Referring to the drawing, an optical recording/reproducing system 1 referred to hereinafter as an optical head comprises a first moving part 3 which is located below the level of a magneto-optical disk 2 referred to hereinafter as a disk and controls the focusing and tracking of an optical beam irradiated on a first recording surface 2a at the lower side of the disk 2. At the time of recording, the optical beam heats the magnetic material on the recording surface and the magnetic material is magnetized in a direction of a magnetic field applied externally on the disk upon cooling of the magnetic material. At the time of reproduction, the plane of polarization of the optical beam is rotated when the optical beam incident to the recording surface is reflected at the recording surface 2a. The direction and the amount of the rotation depends on the direction of the magnetization of the magnetic material on the recording surface. Similarly, a second moving part 4 having an identical construction to the first moving part 3 is located above the disk 2 and the disk 2 is recorded with the information signal on a second recording surface 2b at the upper side of the disk 2. Thus, the information signal is recorded on and reproduced from both sides of the disk 2 without turning over the side of the disk.

The first and second moving parts 3 and 4 respectively comprise first and second optical systems including first and second objective lenses 3a and 4a which face to the first and second recording surfaces 2a and 2b (illustrated by a broken line in FIG.1) of the disk 2 and mirrors 3b and 4b, and focusing actuators 3c and 4c for driving the lenses 3a and 4a upwards and downwards. Further, the first and second moving parts 3 and 4 are moved together along the radial direction of the disk by known tracking actuators 5 and 6 using a linear motor and maintain a proper tracking of the optical beam. The focusing actuators 3c and 4c are known electromagnetic actuators having a similar construction to the voice coil assembly of a moving coil speaker and comprise a magnet and a solenoid. Thus, the focusing actuator maintains a proper focusing of the optical beam on the recording surface of the disk by moving the objective lens to and from the disk 2 responsive to a driving current flowing through the solenoid. As will be described in detail later, the magnet and solenoid of the focusing actuators 3c and 4c are also used to produce a magnetic flux which is used at the time of recording.

The magneto-optical disk recording and reproducing apparatus in FIG.1 further comprises an optical processing unit 7 which is fixed on a frame of the apparatus. The slashed portion below the unit 7 in the drawing designates the frame of the apparatus and indicates that the unit 7 is fixed to the frame of the apparatus. The unit 7 comprises a light source 8 such as a laser diode for producing the optical beam, a tracking detector 9 such as a PIN diode for producing a tracking error signal indicating the deviation of the optical beam from the proper tracking, a focusing detector 10 similar to the detector 9 for producing a focusing error signal indicating the deviation of the optical beam from the proper focusing, and an information signal reproducing circuit 11 for reproducing the information signal in the form of a high frequency signal (RF signal).

Further, there is provided a rotatable mirror 12 in an optical path extending from the unit 7 to the first and second moving parts 3 and 4 such that the mirror 12 is rotatable between first and second states. The mirror 12 is rotated by a motor 16 as will be described. In the first state, the mirror 12 moves out from the optical path and the optical beam from the unit 7 is directed to the first recording surface 2a after passing through the mirror 3b and the first lens 3a of the first moving part 3. In the second state, the mirror 12 interrupts the optical path from the unit 7 to the first moving part 3 and the optical beam is reflected by the mirror 12 now in an interrupting position so as to hit another mirror 33, where the beam is further directed to the second recording surface 2b of the optical disk 2 after passing through the mirror 4b and the lens 4a of the second moving part 4.

As described heretofore, the optical head of the present invention uses a single and fixed optical processing unit 7 for radiating and receiving the optical beam to and from the first and second optical systems on the moving parts 3 and 4, and the recording surface of the disk 2 can be selected simply by rotating the mirror 12 between the first and second states. Thus, a saving in the space conventionally occupied by the automatic turnover mechanism as well as by the relatively bulky optical processing unit 7 is obtained and the optical disk recording and reproducing system can be made significantly compact.

Next, a description of operation of the recording and reproduction of the apparatus will be given in relation to further descriptions on the details of the structure of the optical head.

(1) Recording on the lower side of the disk

When recording an information signal on the first recording surface 2a at the lower side of the disk 2, the user provides a switching signal specifying the lower side of the disk from an input terminal 13 to a motor drive circuit 14. The control signal may be a low level signal or a signal having a negative polarity, for example. Responsive to the control signal, the motor drive circuit 14 which may be a linear amplifier produces an output signal which drives the motor 16 in a counter clockwise direction. Responsive to the driving of the motor 16, the mirror 12 is rotated in the counter clockwise direction and assumes the first state indicated by a broken line in which the mirror 12 abuts to a first stop surface 17a of a stopper 17 and the motor 16 is stopped. In this state, the mirror 12 is located outside of the optical path extending from the unit 7 to the first moving part 3 indicated by A in the drawing. The mechanism to stop the motor 16 responsive to the abutting of the mirror 12 to the stop surface 17a may be any known such mechanism and further description will be omitted.

Figure 2:
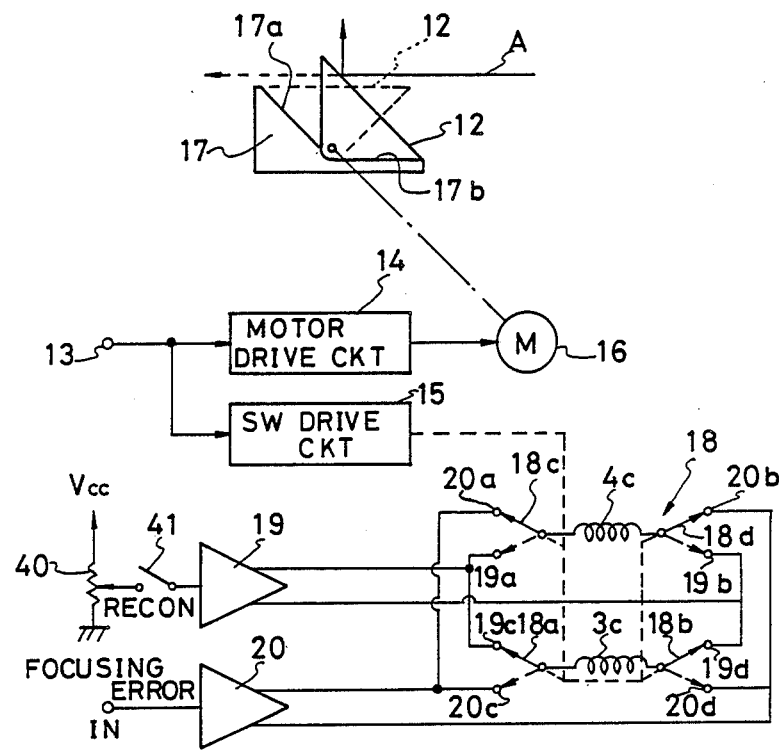
FIG.2 is a schematic circuit diagram showing a part of the optical recording/reproducing system of FIG.1.

Further, the same control signal is supplied to a switch drive circuit 15 which activates a switch 18 which in turn switches the connection between a bias drive circuit 19, focusing actuator drive circuit 20, and the solenoids of the focusing actuators 3c and 4c as will be described. Referring to FIG.2, the focusing error signal produced by the detector 10 is supplied to a FOCUSING ERROR IN terminal of the driving circuit 20 which produces a driving current of the solenoid of the focusing actuator 3c, 4c. The driving current is supplied from an output terminal and returns to another output terminal of the circuit 20. The focusing actuators 3c and 4c are, as previously described, of the known type in which the solenoid is fitted around a magnet core in a movable manner along the axial direction of the magnet core as in the case of the voice coil assembly of a moving coil speaker. The lenses 3a and 4a are carried unitary with the respective solenoids. The switch 18 comprises a moving contact 18a to be selectively connected to either one of contacts 19c and 20c, a moving contact 18b to be selectively connected to either one of contacts 19d and 20d, a moving contact 18c to be selectively connected to either one of contacts 19a and 20a, and a moving contact 18d to be selectively connected to either one of contacts 19b and 20b. The bias drive circuit 19 has a similar construction as the focusing actuator drive circuit 20 in which a predetermined bias signal from a rheostat 40 connected to a source voltage Vcc is supplied through a switch 41 which is closed at the time of recording, and a predetermined level of bias current is outputted from one of the output terminals responsive to the input bias signal and returns to the other output terminal. The contacts 20a and 20c are connected to one of the output terminals of the focusing actuator drive circuit 20 and the contacts 20b and 20d are connected to the other output terminals of the circuit 20. Further, the contacts 19a and 19c are connected to one of the output terminals of the bias drive circuit 19 and the contacts 19b and 19d are connected to the other of the output terminals of the circuit 19.

Responsive to the control signal to the input terminal 13 specifying the lower side of the disk, the moving contacts 18a and 18b make contact with the terminals 20c and 20d which are, as previously described, connected to the focusing actuator drive circuit 20. At the same time, the moving contacts 18c and 18d make contact with the terminals 19a and 19b which are connected to the bias drive circuit 19. Thus, the output driving current from the focusing actuator drive circuit 20 flows through the solenoid of the first actuator 3c located below the level of the disk 2. Thus, the solenoid is moved responsive to the focusing error signal and the distance between the lens 3a and the first recording surface 2a is adjusted. Further, the predetermined level of the bias current from the bias drive circuit 19 flows through the solenoid of the focusing actuator 4c located above the disk 2 responsive to the closure of the switch 41 at the time of recording and applies a first magnetic field to the disk 2 at the portion on which the recording is to be made in a first direction as illustrated. This magnetic field is used for recording as will be described.

Responsive to the activation of the recording mode by the user which includes the closing of the switch 41 as aforementioned, the laser diode 8 is energized by the driving signal modulated with the information signal to be recorded at an input terminal 8a and a relatively intense optical beam modulated with the information signal is produced by the laser diode 8. As shown in FIG.1, this optical beam is outputted from the optical processing unit 7 in a form of a parallel beam after passing through a collimator lens 21, a grating 22, and beam splitters 23 and 24. In the recording and reproduction of the lower side of the disk, the mirror 12 is rotated to a position indicated by the broken line as described previously. In other words, the mirror 12 is outside of the optical path A. Therefore, the optical beam from the unit 7 directly enters the moving part 3 at the lower side of the disk 2. In the moving part 3, the optical beam is reflected by the mirror 3b and focused on the first recording surface 2a of the disk 2 by the objective lens 3a. The optical beam reflected back from the recording surface 2a is returned to the unit 7 after passing through the lens 3b and reflection at the mirror 3b.

This reflected optical beam returned to the unit 7 is passed through the beam splitter 24 and is then reflected by the beam splitter 23. The optical beam is then passed through another beam splitter 25 and a cylindrical lens 26 and reaches the focusing detector 10. The focusing detector 10 is a known detector having a quadrant imaging field for receiving the optical beam and produces the focusing error signal responsive to the difference between a sum of the intensity of light received at the first and third quadrant and a sum of the intensity of the light received at the second and fourth quadrant. This difference represents the error in the distance between the recording surface 2a and the objective lens 3a as compared to the proper focal length. The principle of the quadrant focusing detector is well known and further description thereof will be omitted.

The focusing error signal thus obtained is supplied to the focusing actuator drive circuit 20 and the circuit 20 produces the output drive current which flows through the solenoid of the first focusing actuator 3c as already described. As a result, the objective lens 3a is moved to and from the disk 2 and assumes a position in which the distance between the lens and the recording surface 2a is substantially equal to the focal length of the lens.

A part of the light reflected back from the disk 2 is reflected by the beam splitter 25 and directed to the tracking detector 9. This tracking detector 9 is also a known quadrant type detector having a quadrant imaging field. In such a detector, the spot of optical beam formed on the quadrant imaging field shifts to one or the other direction when the optical beam is offset and the proper tracking is lost. Thus, such a detector detects the tracking error as a difference between a sum of the intensity of the light detected in the first and second quadrant imaging field and a sum of the intensity of the light detected in the third and fourth quadrant imaging field. The principle of such tracking detector is well known and further description thereof will be omitted. The tracking error signal obtained by the detector 9 is supplied to to the tracking actuators 5 and 6 of the first and second moving parts 3a and 4. As previously described, the actuators 5 and 6 may be a linear actuator using a linear motor and moves the moving parts 3 and 4 simultaneously in the radial direction to and from the disk such that the optical beam from the laser diode 8 falls exactly on a predetermined groove which forms the track on the disk. For this purpose, one at the first and second tracking actuators 5 and 6 may be driven by a single tracking error signal and the other tracking actuator may be connected mechanically thereto. The line 100 in FIG.1 indicates that the linear actuators 5 and 6 are driven simultaneously either electrically or mechanically. It should be noted that only the moving parts 3 and 4 are moved in the optical head of the present invention. As the moving parts 3 and 4 are small and light in weight, the time required for the optical beam to reach to the desired track is significantly reduced.

In the recording mode, the magnetic material on the first recording surface 2a is heated to a temperature above the Curie point and is cooled off subsequently responsive to the removal of the optical beam. Thereby, the magnetic material is magnetized in the direction of the magnetic field produced by the solenoid of the second focusing actuator 4c. The intensity of the magnetic field may be optimized by adjusting the rheostat 40. The principle of such magneto-optical recording and the control of the optical beam therefor is well known and no further description will be given thereof.

(2) Reproduction from the lower side of the disk

Next, description will be given for the case in which the information signal is recorded on the first recording surface 2a of the lower side of the disk 2. As the focusing control and tracking control are identical to the case of the recording on the lower side of the disk, the description thereof will be omitted.

The optical beam reflected at the recording surface 2a has a plane of polarization which is rotated by a predetermined angle responsive to the direction of the magnetization of the recording surface 2a. Thus, when the direction of magnetization is in the upward direction, the plane of polarization of the reflected beam rotates to a first direction while the plane of polarization rotates to an opposite direction when the direction of magnetization of the recording surface is in the downward direction. As a result, the reflected optical beam from the recording surface 2a has different plane of polarization depending on the direction of the magnetization of the recording surface of the disk. For example, the reflected beam may have a plane of polarization rotated in a clockwise direction when the recording surface is magnetized in the upward direction and may have the plane rotated in a counter clockwise direction.

The reflected optical beam is then passed through the objective lens 3a and returns to the optical processing unit 7 after reflection at the mirror 3b. The optical beam thus reflected from the disk 2 is then passed through a half wave plate 27 where the plane of polarization is rotated by 45°. The optical beam is then passed through a beam splitter 28 which is a polarization beam splitter designed to pass preferentially an optical beam having a first plane of polarization and to reflect an optical beam having a second plane of polarization which is perpendicular to the first plane of polarization. The optical beam passed through the beam splitter 28 is then directed to a detector 31 after reflection at a mirror 30 while the optical beam reflected by the beam splitter 28 is received by a detector 29. The detectors 31 and 29 are respectively connected to a non-inverting input terminal and an inverting input terminal of a differential amplifier 32 which produces an output high frequency signal corresponding to the information signal recorded on the recording surface 2a.

Referring to FIG.1 again, the optical beam reflected by the recording surface 2a having the upward magnetizing direction and having the plane of polarization rotated to a first direction is preferentially passed through the beam splitter 28 and reaches the detector 31. On the other hand, the reflection of the same optical beam at the beam splitter 28 is minimized and no substantial optical beam arrives at the detector 29. Thus, the detector 31 produces a high level output to be supplied to the non-inverting input terminal of the amplifier 32 and the detector 29 produces a low level output to be supplied to the inverting input terminal of the detector 32. As a result, the detector 32 produces a high level output signal responsive to the upward magnetization of the recording surface 2a. When the direction of magnetization of the recording surface 2a is in the downward direction, the optical beam is preferentially supplied to the detector 29 while no substantial optical beam is detected by the detector 31. Thus, a high level signal is applied to the inverting input terminal of the amplifier 32 from the detector 29 and a low level signal is applied to the non-inverting input terminal of the amplifier 32. As a result, the differential amplifier 32 produces a low level output responsive to the downward magnetization of the recording surface of the disk 2. It should be noted that the half wave plate 27 used to rotate the plane of polarization of the reflected optical beam by 45° may be rotated around the center of the optical path by a suitable amount such that the plane of polarization matches the operation of the polarization beam splitter 28 and that the optical beam is properly passed or reflected by the beam splitter 28 depending on the plane of polarization. With this adjustment, the intensity of the optical beam detected by the detector 31 at the time of upward magnetization of the recording surface and the intensity of the optical beam detected by the detector 29 at the time of downward magnetization of the recording surface are set approximately equal.

(3) Recording on the upper side of the disk

In this recording mode, the user first selects the recording surface 2b of the disk 2 by providing the control signal specifying the second recording surface to the input terminal 13. The control signal may be a high level signal or signal having a positive polarity. Responsive to the control signal, the motor drive circuit 14 and the switch drive circuit 15 produce output signals to the motor 16 and to the switch 18. Responsive to the output signal from the motor drive circuit 14, the motor 16 is driven and the mirror 12 is rotated in a clockwise direction. The mirror then abuts to a horizontal stop surface 17b of the stopper 17 as shown in the solid line and the motor 16 is stopped in this state in which the mirror is located within the optical path A. Thus, the optical beam exited from the optical processing unit 7 is reflected by the mirror 12 and directed to the second moving part 4 after reflection at the stationary mirror 33, wherein the optical beam is focused on the second recording surface 2b of the disk 2 as previously described.

At the same time as the rotation of the mirror 12, the switch drive circuit 15 activates the switch 18 as illustrated by the solid line in FIG.2. In this state, the moving contacts 18a and 18b make contact with the terminals 19c and 19d of the bias drive circuit 19. Further, the moving contacts 18c and 18d make contact with the terminals 20a and 20b connected to the focusing actuator drive circuit 20. Thereby, the solenoid of the focusing actuator 4c is supplied with the drive current from the focusing actuator drive circuit 20 responsive to the focusing error signal.

Responsive to the activation of the recording mode, the optical beam produced by the laser diode 8 of FIG.1 is exited from the optical processing unit 7 as previously described. As the mirror 12 is in the second state as indicated by the solid line, the optical beam from the unit 7 is reflected by the mirror 12 in the upward direction and enters the second moving part 4 after reflection at the mirror 33. The optical beam is received by the mirror 4b and is focused on the second recording surface 2b after passing through the second lens 4a.

The optical beam reflected at the second recording surface 2b traces the same optical path of the incident optical beam in the backward direction and returns to the optical processing unit 7. The reflected optical beam from the disk 2 then reaches the focusing detector 10 and the tracking detector 9 as already explained with reference to the case of recording on the lower side of the disk. The tracking error signal from the focusing detector 10 is amplified by the focusing actuator drive circuit 20 as already described and the output drive signal of the circuit 20 flows through the solenoid of the second focusing actuator 4c. Responsive to the driving current, the focusing actuator 4c moves the second objective lens 4a to and from the disk 2 and the distance between the lens 4a and the second recording surface 2b is optimized. Similarly, the tracking error signal from the tracking detector 9 is supplied to the actuators 5 and 6 and the first and second actuators are moved together in the radial direction of the disk 2 in a unitary manner.

Responsive to the activation of the recording mode, the switch 41 at the input of the bias drive circuit 19 is closed similarly to the case of recording on the lower side of the disk, and the bias drive circuit 19 outputs the drive current which flows through the solenoid of the focusing actuator 3c located below the disk 2. The leakage flux of the solenoid provides a second magnetic field which is necessary at the time of recording by the optical beam. The direction of the second magnetic field may be opposite to the direction of the first magnetic field. Then, the optical beam from the moving part 4 in the upper side of the disk 2 heats the magnetic material on the recording surface 2b to a temperature which exceeds the Curie point, and the magnetic material is magnetized in the direction of the magnetic field upon cooling due to the removal of the optical beam.

(4) Reproduction from the upper side of the disk

Next, description will be given for the reproduction of the information signal recorded on the second recording surface 2b at the lower side of the disk 2. As the focusing and tracking control is made similar to the case of the reproduction of the information signals from the first recording surface 2b on the upper side of the disk 2, the description thereof will not be repeated here.

The optical beam focused on the recording surface 2b and reflected therefrom has a plane of polarization which is rotated responsive to the direction of magnetization of the recording surface 2b. The reflected optical beam thus produced is returned back to the optical processing unit 7 after passing through the objective lens 4a and being reflected by the mirror 4b, mirror 33 and the mirror 12. The optical beam is then processed as already described in the unit 7 and the reproduced high frequency signal corresponding to the information recorded on the second recording surface 2b is obtained from the differential amplifier 32.

Further, the present invention is not limited to these embodiments, but various variations and modifications may be made without departing from the scope of the present invention. For example, the present invention can also be applied to general type of optical disks other than the magneto-optical type disk as described. Further, the magnetic field used for the recording by the optical beam may also be obtained from the solenoid for the focusing actuator itself during the use of the solenoid for the focusing control of the optical beam. Furthermore, the magnetic field produced by the solenoid of the focusing actuator in the opposite side of the disk may be augmented or diminished responsive to the intensity of the magnetic flux from the solenoid of the focusing actuator located on the one side of the disk.

What is claimed is:

1. A magneto-optical recording system for recording an information signal on both sides of a disk-shaped magneto-optical information recording medium by means of an optical beam comprising:

a first optical system at a first side of the recording medium, said first optical system being supplied with the optical beam and focusing the optical beam on a first recording surface of the recording medium at the first side, said first optical system further receiving the optical beam reflected back from the first recording surface as a result of reflection of the optical beam focused on the first recording surface of the recording medium and outputting the received optical beam;

a first electromagnetic actuator at the first side of the recording medium and carrying the first optical system in a movable manner in a direction to and from the first recording surface of the recording medium;

a second optical system at a second side of the recording medium, said second optical system being supplied with the optical beam and focusing the optical beam on a second recording surface of the recording medium at the second side, said second optical system further receiving the optical beam reflected back from the second recording surface as a result of reflection of the optical beam focused on the second recording surface of the recording medium and outputting the received optical beam;

a second electromagnetic actuator at the second side of the recording medium and carrying the second optical system in a movable manner in a direction to and from the second recording surface of the recording medium;

optical processing means being switched between a first and second states for selectively supplying the optical beam to either one of the first and second optical systems and for receiving the optical beams outputted from the first and second optical systems such that the optical beam is supplied to the first optical system and received from the first optical system when the optical processing means is in the first state and that the optical beam is supplied to the second optical system and received from the second optical system when the optical processing means is in the second state, said optical processing means including light source means for producing and radiating the optical beam modulated with the information signal, said optical processing means further including detection means supplied with the optical beam returned to the optical processing means for producing a focusing error signal indicating the deviation in the focusing of the optical beam;

focusing actuator driving means for producing a driving current to be supplied selectively to either one of the first and second electromagnetic actuators responsive to the focusing error signal for driving the electromagnetic actuators so as to minimize the focusing error signal;

biasing means for producing a biasing current to be supplied selectively to either one of the first and second electromagnetic actuators which is not supplied with the driving current from the focusing actuator driving means for producing a magnetic field to be applied to the recording medium; and switching means supplied with a control signal specifying either one of the first and second side of the disk by a first and second electrical state of the signal for switching the state of the optical processing means to the first state when the control signal is in the first electrical state and to the second state when the control signal is in the second electrical state and for selectively supplying the drive current from the focusing actuator driving means to the first electromagnetic actuator when the control signal is in the first electrical state and to the second electromagnetic actuator when the control signal is in the second electrical state, said switching means further supplying the biasing current from the biasing means selectively to the second electromagnetic actuator when the control signal is in the first electrical state and to the first electromagnetic actuator when the control signal is in the second electrical state.

2. A magneto-optical recording system as claimed in claim 1 in which said first optical system comprises a first objective lens for focusing the optical beam on the first recording surface of the recording medium and for receiving the optical beam reflected back from the first recording surface and a first optical path means for receiving and directing the optical beam incident to the first optical system to the first objective lens and for outputting the optical beam received by the first objective lens, said second optical system comprises a second objective lens for focusing the optical beam on the second recording surface of the recording medium and for receiving the optical beam reflected back from the second recording surface and a second optical path means for receiving and directing the optical beam incident to the second optical system to the second objective lens and for outputting the optical beam received by the second objective lens.

3. A magneto-optical recording system as claimed in claim 1 in which said optical processing means comprises an optical path switching part including a rotary mirror rotatable between a first and second positions and an electrical motor for driving the rotary mirror between the first and second positions, and a stationary optical part including the light source means and the detection means, said optical path switching part and said stationary optical part being disposed such that the optical beam from the stationary optical part is incident to the rotary mirror of the optical path switching part and is transferred to the first optical system when the rotary mirror is in the first position and to the second optical system when the rotary mirror is in the second position, said switching means drives the motor such that the rotary mirror assumes the first position responsive to the first electrical state of the control signal and the rotary mirror assumes the second position responsive to the second electrical state of the control signal.

4. A magneto-optical recording system as claimed in claim 1 in which said first and second electromagnetic actuators comprise respective electromagnetic solenoids, said switching means comprises a switch assembly for selectively connecting the focusing actuator driving means to the solenoid of the first electromagnetic actuator and for selectively connecting the bias driving means to the solenoid of the second electromagnetic actuator responsive to the first electrical state of the control signal, said switch assembly further selectively connecting the focusing actuator driving means to the solenoid of the second electromagnetic actuator and for selectively connecting the bias driving means to the solenoid of the first electromagnetic actuator.

5. A magneto-optical recording system as claimed in claim 1 in which the optical processing means further comprises a second detecting means for producing a tracking error signal representing the deviation in the tracking of the optical beam, said first and second electromagnetic actuators are carried by third and fourth electromagnetic actuators respectively in a manner movable in the radial direction of the recording medium, and said third and fourth electromagnetic actuators are driven unitarily with the tracking error signal produced by the optical processing means.

6. A magneto-optical recording system as claimed in claim 5 in which the third and fourth electromagnetic actuators are electrically connected and driven unitarily by the common tracking error signal.

* * * * *